United States Patent
Grimmel

(10) Patent No.: US 7,438,808 B2
(45) Date of Patent: Oct. 21, 2008

(54) SAND CATCHER

(75) Inventor: Walter Grimmel, Ober-Mörlen (DE)

(73) Assignee: Werkstoff & Funktion Grimmel Wassertechnik GmbH, Ober-Moerlen (DE)

( * ) Notice: Subject to any disclaimer, the term of this patent is extended or adjusted under 35 U.S.C. 154(b) by 463 days.

(21) Appl. No.: 10/492,840

(22) PCT Filed: Oct. 18, 2002

(86) PCT No.: PCT/DE02/03939

§ 371 (c)(1),
(2), (4) Date: Nov. 12, 2004

(87) PCT Pub. No.: WO03/035210

PCT Pub. Date: May 1, 2003

(65) Prior Publication Data

US 2005/0045546 A1    Mar. 3, 2005

(30) Foreign Application Priority Data

Oct. 18, 2001 (DE) ................. 101 51 498
May 13, 2002 (DE) ................. 102 21 232

(51) Int. Cl.
*C02F 9/02* (2006.01)
*C02F 1/24* (2006.01)
*B01D 21/02* (2006.01)
*B01D 21/24* (2006.01)
*B01D 21/26* (2006.01)

(52) U.S. Cl. .............. 210/220; 210/221.2; 210/523; 210/532.1; 210/534

(58) Field of Classification Search .............. 210/221.2, 210/220, 532.1, 534, 523
See application file for complete search history.

(56) References Cited

U.S. PATENT DOCUMENTS 2,532,457 A * 12/1950 Morgan .................. 210/738

(Continued)

FOREIGN PATENT DOCUMENTS

DE     32 07 658       9/1983

(Continued)

OTHER PUBLICATIONS

Von Franz Pöpel et al., "Der neue belüftete Sandfang auf der biologischen Reinigungsanlage der Stadt Heilbronn" (English translation: "The New Ventilated Detritus Chamber On The Biological Cleaning Equipment Of The City Heilbronn"), GWF, May 30, 1958, pp. 535-539, vol. 99, Issue 22.

*Primary Examiner*—Thomas M Lithgow
(74) *Attorney, Agent, or Firm*—Crowell & Moring LLP

(57) ABSTRACT

The invention relates to a sand catcher comprising a deposition chamber (1) that is configured as a steel container with a cylindrical cross-section, traversed in a longitudinal direction. Said deposition chamber comprises air-supply nozzles (4) on one longitudinal side for generating a circulatory motion or the water transversally to the longitudinal direction of the deposition chamber (1) and a sand collection channel (3), located in the lower section, that runs in a longitudinal direction. A waste water inlet (6) for generating the circulatory motion of the water leads into the upper section of the deposition chamber (1), running transversally to said chamber. The air-supply nozzles (4) are provided on the side of the waste water inlet (6) below the latter (6).

18 Claims, 5 Drawing Sheets

U.S. PATENT DOCUMENTS

| | | | | |
|---|---|---|---|---|
| 2,705,562 | A * | 4/1955 | Albertson | 209/464 |
| 3,024,909 | A * | 3/1962 | Dahlstrom | 209/725 |
| 3,195,727 | A * | 7/1965 | Kibbee | 210/195.4 |
| 3,297,567 | A * | 1/1967 | Tapleshay | 210/629 |
| 3,623,608 | A * | 11/1971 | Waterman | 210/101 |
| 3,630,372 | A * | 12/1971 | Weir et al. | 210/197 |
| 3,710,941 | A * | 1/1973 | Brociner | 210/776 |
| 3,984,322 | A * | 10/1976 | Peasley et al. | 210/197 |
| 4,663,046 | A * | 5/1987 | Feldkirchner et al. | 210/616 |
| 4,670,142 | A * | 6/1987 | Lowry | 210/207 |
| 5,587,067 | A * | 12/1996 | Love | 210/155 |
| 5,811,016 | A * | 9/1998 | Zierler | 210/772 |

FOREIGN PATENT DOCUMENTS

| | | |
|---|---|---|
| DE | 3207658 | 9/1983 |
| DE | 19509738 | 9/1996 |
| EP | 0 685 431 | 12/1995 |
| EP | 1134323 | 9/2001 |
| FR | 2138494 | 1/1973 |

* cited by examiner

SAND CATCHER

The invention relates to a sand catcher, comprising a deposition chamber, which is traversed in the longitudinal direction, has a wastewater inlet and a water outlet, has air supply nozzles on one longitudinal side for generating a circulatory motion of the water transversely to the longitudinal direction of the deposition chamber, and has a sand collection channel, which runs in the longitudinal direction, in the lower section.

A sand catcher of the aforementioned type is described in the journal "gwf", volume 99, issue 22, May 30, 1958, pages 535-539. The special feature of the sand catcher, which is explained in this document and is made of concrete, lies in the fact that its deposition chamber has an oval cross section and that a circulatory motion of the water is generated by lateral air nozzles. The wastewater flows axially to the deposition chamber, destroying the kinetic energy of the oncoming water by means of an impact wall, provided at the inlet, with vortex chamber, so that the air nozzles can produce undisturbed the desired circulatory motion.

The drawback with this prior sand catcher is that the desired circulatory motion can be realized only partially and that relatively large quantities of compressed air must be introduced. Furthermore, in the ideal case the quantity of air has to be regulated as a function of the quantity of wastewater flowing in, because the energy requirement for generating the circulatory motion increases as the quantity of wastewater increases.

The invention is based on the problem of designing a sand catcher of the class described in the introductory part in such a manner that the requisite circulatory motion can be generated as reliably as possible and with a minimum air requirement.

The invention solves this problem in that the wastewater inlet for generating the circulatory motion of the water leads transversely to the deposition chamber, into the upper section of said deposition chamber; and the air supply nozzles are provided on the side of the wastewater inlet below the wastewater inlet.

Due to this inventive orientation of the wastewater inlet the kinetic energy of the water flowing in does not have to be destroyed, as explained in the publication cited in the introductory part, by means of an impact wall and vortex chamber. Rather, as in the case of a cyclone, this kinetic energy can be used to generate the circulatory motion. Therefore, the circulatory motion is generated independently of the compressed air that is fed in. The only function that the introduced compressed air still has is to assist the circulatory motion and to maintain it over the length of the deposition chamber. Therefore, the inventive sand catcher needs a significantly smaller quantity of air, so that hardly any more compressed air is necessary than what is already present to remove grease and organic substances from the sand. Under some circumstances, one can also work with pressurized water, instead of compressed air, so that the water issues under pressure from the air supply nozzles, provided according to the invention, a feature that also induces the water to circulate in the deposition chamber.

It is especially advantageous to provide incrementally the air supply nozzles at intervals from the wastewater inlet that increase in the longitudinal direction of the deposition chamber. In such an arrangement optimal consideration is given to the fact that the circulatory motion is generated then primarily by the energy of the wastewater flowing in transversely and that the friction-induced flow losses do not have to be balanced by the energy of the compressed air until the distance from the wastewater inlet increases.

If it is important that more grease be removed—for example in the food industry, it is advantageous to provide a flotation section on the outlet side of the deposition chamber. To generate fine air bubbles, the flotation section has air nozzles with a small cross section.

The sand catcher of the invention can be manufactured especially economically and can be delivered as a functional unit, if the deposition chamber is designed as a cylindrical steel container. Such steel containers are commercially available at a good price as standardized components with outwardly rounded heads.

The sand catcher can perform at the same time additional functions and hence be designed as a compact system, if, according to another further development of the invention, the wastewater inlet has a screening grate, from which a rake removes the screenings. Such a rake can be designed, for example, as described in the DE 195 09 738 A1, so that a fully automatic operation is possible and the screenings can be thrown to the side of the deposition chamber.

The water in the deposition chamber flows around the bottom side of the screening grate, so that the risk of clogging is low, if, according to another further development of the invention, the screening grate runs at least partially below the filling height of the deposition chamber.

Fatty substances, which have detached themselves from the sand in the deposition chamber or float freely in the wastewater, move due to buoyancy automatically to one end of the deposition chamber, from where they can be readily extracted, when the deposition chamber rises, seen from the direction of the wastewater inlet.

In this respect it is especially advantageous for the sand collection channel to have a sand conveyor screw, which conveys the sand to a discharge side, and for the sand discharge point to lie above the water level in the deposition chamber owing to the inclination of the deposition chamber. In this manner the sand conveyor screw can convey the sand as far as the discharge point, so that no additional transport mechanism for ejecting the sand is necessary.

The water outlet is designed optimally, if it is formed by a transversely running channel on the side of the deposition chamber opposite the wastewater inlet.

The water leaves the deposition chamber without generating any turbulence in said deposition chamber and without taking any floating matter with it, when, according to another further development of the invention, the channel exhibits on its side facing the wastewater inlet a side wall that extends higher than the maximum water level in the deposition chamber, and on its side, facing away from the wastewater inlet, a side wall, which forms an overflow edge, over which the water runs into the channel.

However, it is also possible as an alternative that the side walls of the channel have the same height and that in front of the side facing the wastewater inlet a downflow wall projects from the top into the deposition chamber. In this manner the channel has two overflow edges.

Grease and other floating matter can be removed separately, if in front of the higher side wall or the downflow wall there is a scum intake, which extends as far as just below the normal water level in the deposition chamber.

In the event of malfunctions in the sand catcher, the wastewater can bypass easily said sand catcher, if a bypass line, which is provided preferably with a device for coarse purification of the water, runs from the wastewater inlet behind an overflow edge to the water outlet. In this case it involves, for example, a screening grate, which is to be cleaned manually and has a slit width of approximately 20 to 30 mm. Furthermore, there can also be a scum catcher that can overflow. In place of the overflow edge, there can also be a slide valve, which is opened when the water accumulates in front of the wastewater inlet.

The water rotating in the deposition chamber flows first through an equalizing stretch before it passes with the sand to be removed to the sand collection channel, when, according to another further development of the invention, the sand collection channel is displaced with respect to a perpendicular central axis of the deposition chamber in the direction of the side of the screening grate.

As an alternative to the aforementioned water outlet with a channel running transversely to the deposition chamber, there can also be an overflow pipe, which empties into an overflow channel, attached externally to the deposition chamber. It has the advantage that the rotation of the water in the cylindrical deposition chamber extends over its entire length so that its solids removal efficiency is increased.

Preferably the overflow pipe empties into the deposition chamber in the area of its longitudinal axis. There the still remaining sand concentration is minimal, so that almost sandless water is removed from the deposition chamber.

The arrangement of a baffle below the wastewater inlet also forces the circulation of the water that is generated by the air bubbles flowing in.

The invention permits various embodiments. To further explain its basic principle, two embodiments are depicted as schematic drawings and are described below.

Figure 1:
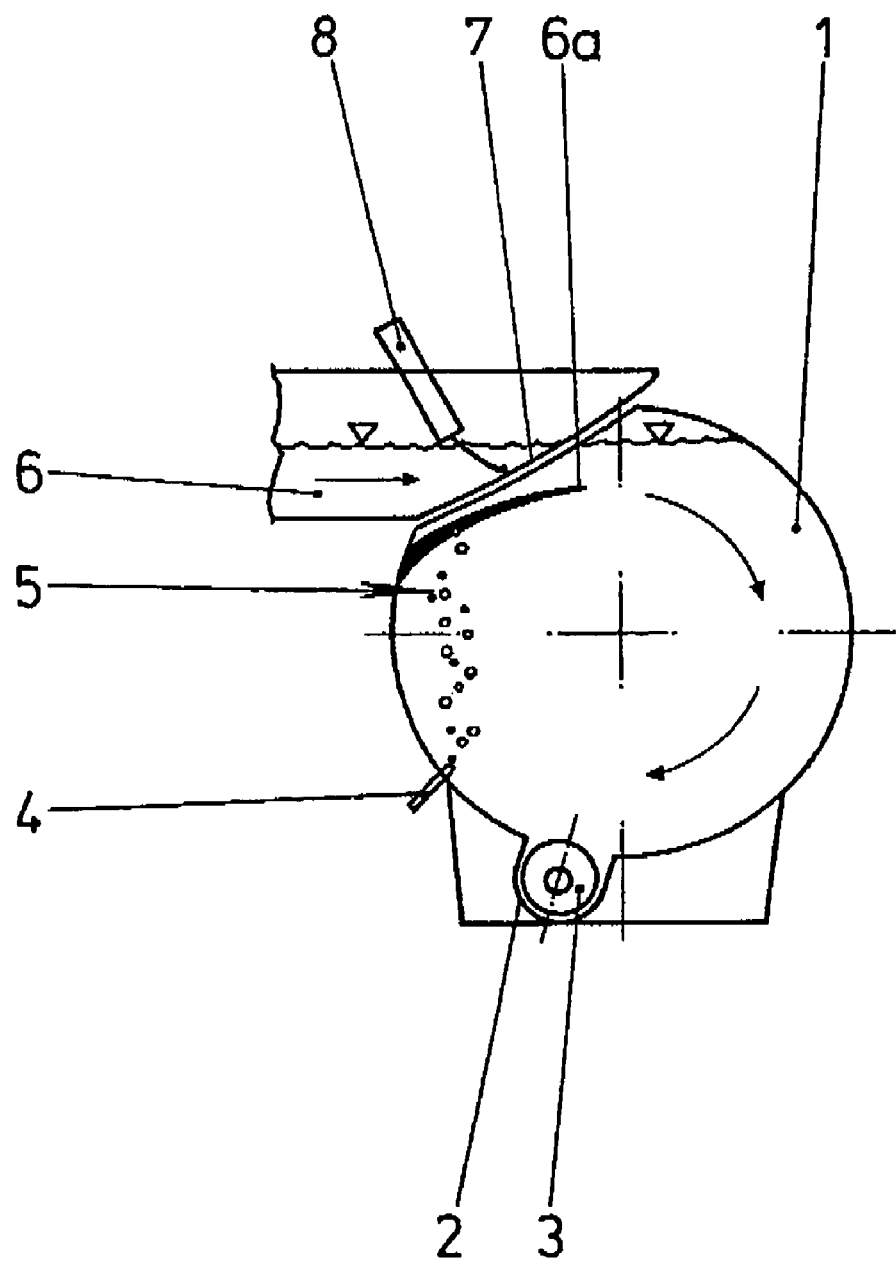
FIG. 1 is a cross section of a sand catcher, according to the invention.

The sand catcher, depicted in FIG. 1, has a deposition chamber 1 with a cylindrical cross section. In the lower section, seen in the drawing shifted to the left, this deposition chamber 1 has a sand collection channel 2, which runs in the longitudinal direction of the deposition chamber 1 and in which there is a sand conveyor screw 3. On the side of the sand collection channel 2, air supply nozzles 4, from which air bubbles 5 rise to the top owing to the supply of compressed air, are arranged in succession over the entire length of the deposition chamber 1.

Similarly on the side of the sand collection channel 2 a wastewater inlet 6 is arranged on the upper side of the deposition chamber 1. This wastewater inlet contains an inclined screening grate 7, over the top side of which a rake 8 can move so that the screenings pass into an ejector (not illustrated). Below the screening grate there is a baffle 6a, which assists air bubbles-induced circulation, by introducing the water flowing in through the wastewater inlet 6 tangentially into the deposition chamber 1.

Figure 2:
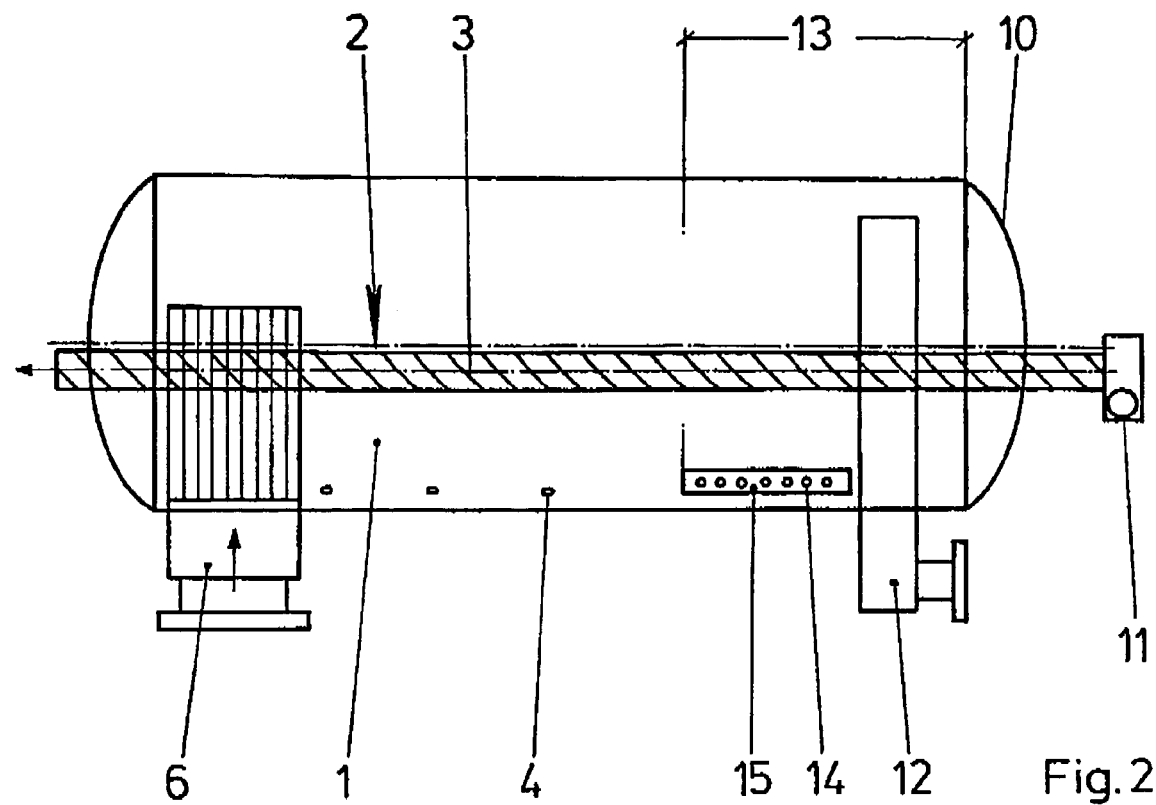
FIG. 2 is a top view of the sand catcher.

FIG. 2 shows that the deposition chamber 1 is designed as a steel container with outwardly rounded heads 10. Shown as a schematic drawing is the sand collection channel 2 with the sand conveyor screw 3, which conveys the sand that has settled out to a sand discharge point 11. Furthermore, FIG. 2 shows the wastewater inlet 6 on the left side of the deposition chamber 1 and a water outlet 12, through which the purified water leaves the deposition chamber 1.

On the side of the water outlet 12 the deposition chamber 1 has a flotation section 13, which differs from the rest of the section in that, in place of the air supply nozzles 4, there are relatively fine air nozzles 14 in an air hose 15. Through these air nozzles 14 air flows in the form of fine air bubbles into the water with the result that more grease is removed in the flotation section 13.

Figure 3:
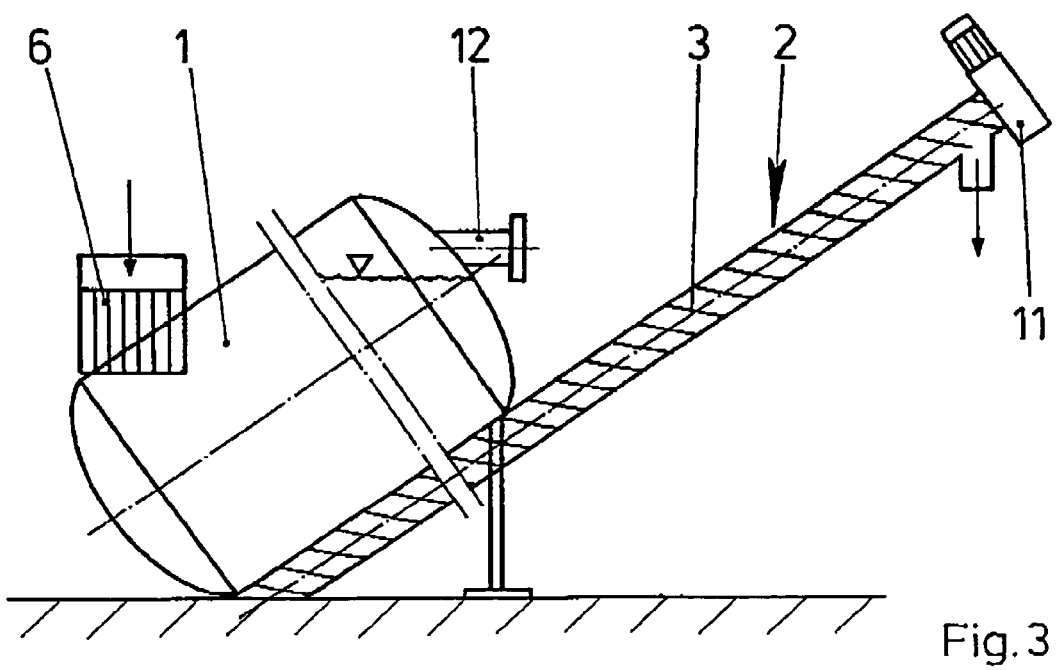
FIG. 3 is a side view of a second embodiment of the inventive sand catcher.

In the embodiment, according to FIG. 3, the deposition chamber 1 rises from the wastewater inlet 6 to the water outlet 12. Thus, the sand discharge point 11 can be arranged so high that it lies above the water level in the deposition chamber 1 and that the sand conveyor screw 3 can convey the sand that is removed directly to the sand discharge point 11.

Figure 4:
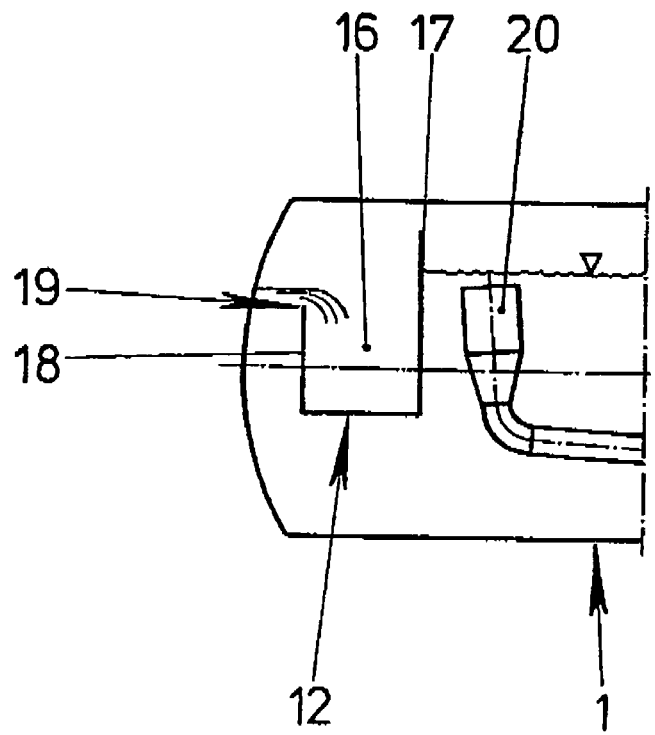
FIG. 4 is a longitudinal view of a modified, rear section of a sand catcher.

FIG. 4 shows the outlet-sided end of the deposition chamber 1. In this embodiment the water outlet 12 is formed by a transversely running channel 16 on the side of the deposition chamber 1 that is opposite the wastewater inlet 6. This channel has two side walls 17, 18, of which the side wall 17, facing the wastewater inlet 6, is higher than the maximum water level in the deposition chamber 1. The side wall 18 on the side, facing away from the wastewater inlet 6, is lower and forms an overflow edge 19, over which the water runs into the channel 16. Thus, the water always flows from the rear side into the channel, after it had to flow beforehand below the channel.

In front of the higher side wall 17 there is a scum intake 20, which extends as far as just below the normal water level and by means of which the especially fatty and other floating matter can be extracted.

Figure 5:
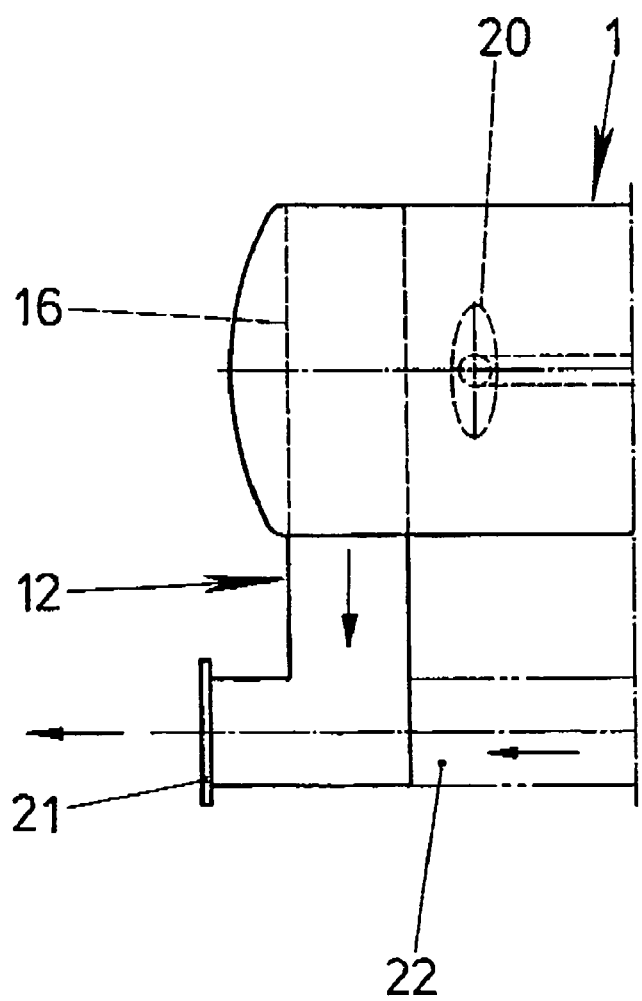
FIG. 5 is a top view of the section, according to FIG. 4.

FIG. 5 illustrates the design shown in FIG. 4. One can see the channel 16 as a part of the water outlet 12 and an outlet connecting pipe 21, through which the water leaves the deposition chamber 1. Furthermore, FIG. 5 shows a bypass line 22, which leads to the outlet connecting pipe 21, and the significance of which is explained by means of FIGS. 6 and 7.

Figure 6:
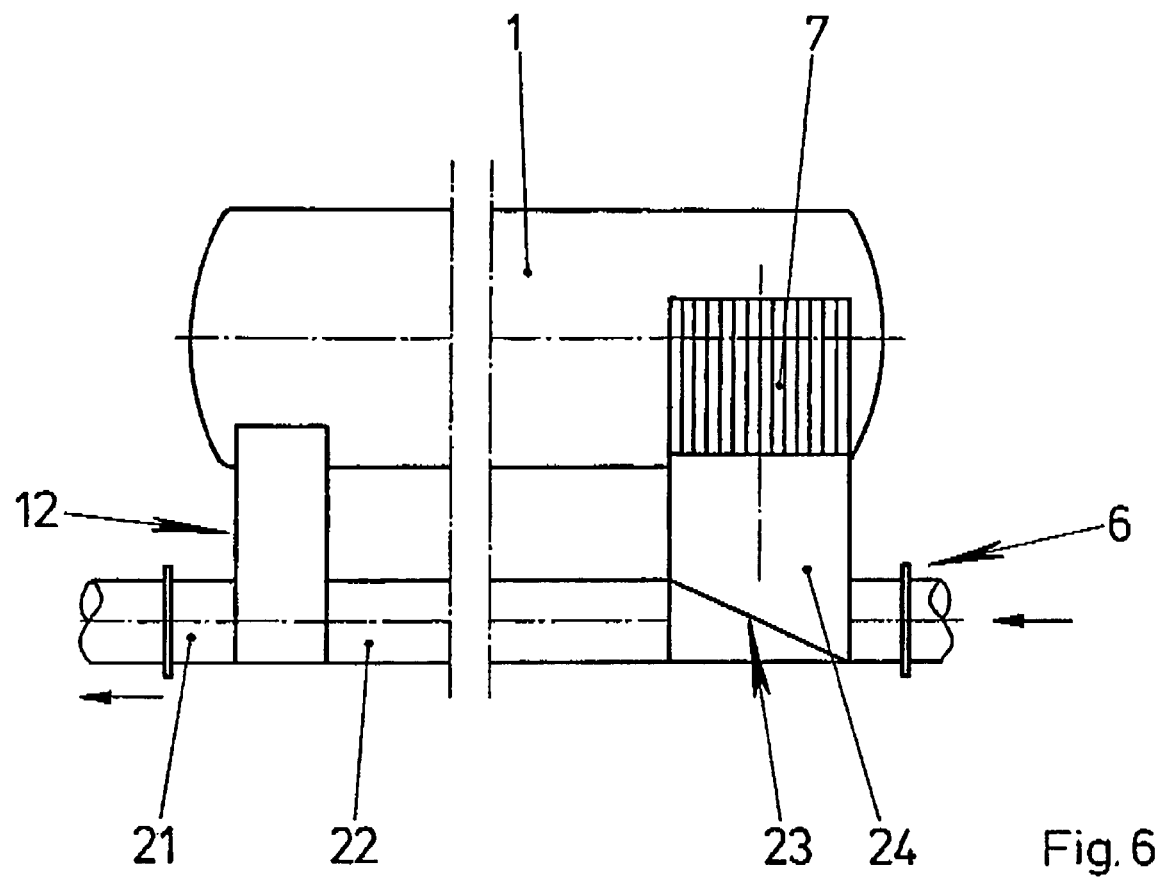
FIG. 6 is a longitudinal view of a modified embodiment of the sand catcher.

FIG. 6 shows that the bypass line 22 leads from the wastewater inlet 6 to the water outlet 12. If the deposition chamber 1 is fed too much wastewater, it does not flow through an inlet channel 24 and the screening grate 7 into the deposition chamber 1, but rather over an overflow edge 23 into the bypass line 22 and from there directly to the water outlet 12.

Figure 7:
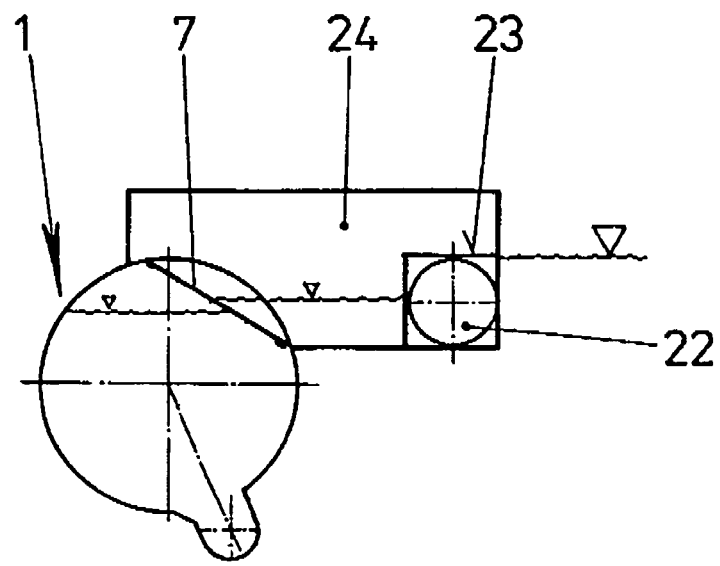
FIG. 7 is a cross section of the embodiment, according to FIG. 6.

FIG. 7 shows the inlet channel 24, which leads to the screening grate 7, and the bypass line 22 behind the overflow edge 23.

A coarse purification and optionally a scum catcher that can overflow is installed in the bypass line 22, which is not illustrated here in detail.

Figure 8:
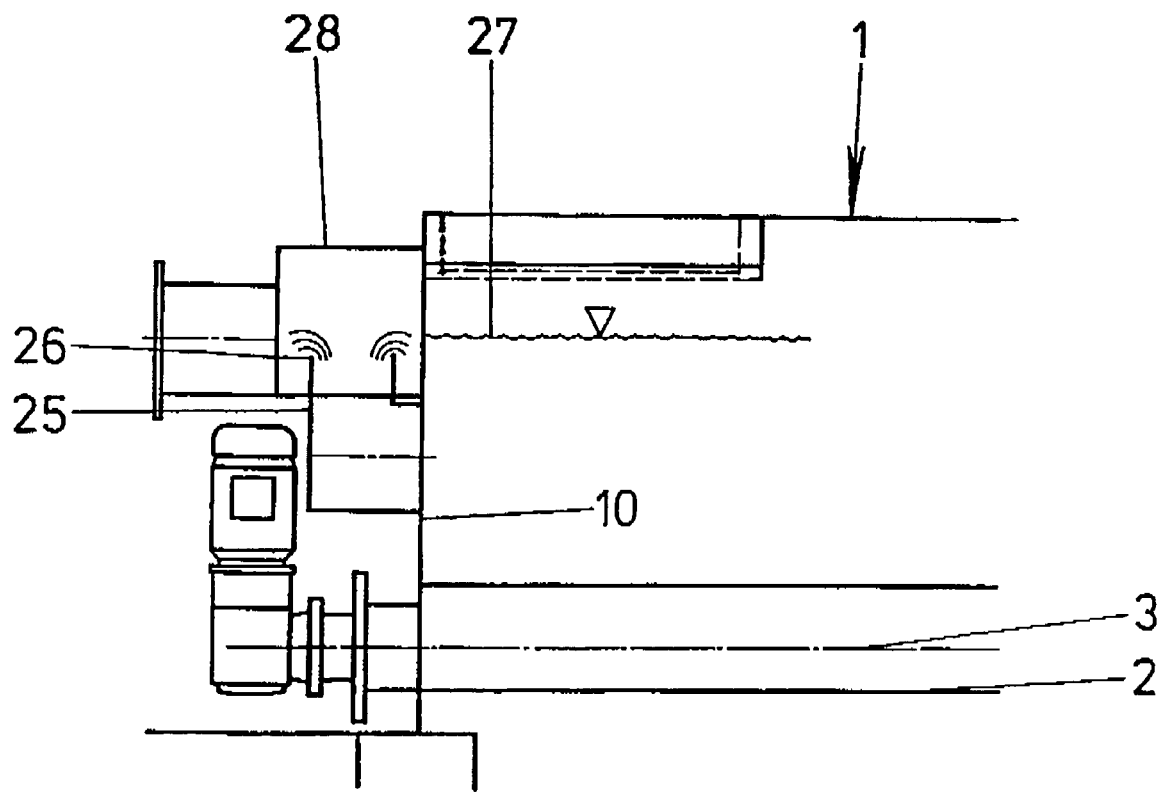
FIG. 8 is a cross section of an alternative embodiment, according to FIG. 4.

FIG. 8 shows a water outlet, which constitutes an alternative to the water outlet, depicted in FIG. 4. An overflow pipe 25, which is bent upwardly and the mouth 26 of which lies below the water level 27 in the deposition chamber 1, attaches axially at a central point on the outlet-sided head 10 of the deposition chamber 1. The overflowing water is collected in an overflow channel 28, attached externally to the outlet-sided head 10 and continues from there. The overflow pipe 25 can be designed in such a manner that one part of pipe wall is formed by the outlet-sided head 10.

LIST OF REFERENCE NUMERALS 1 deposition chamber
2 sand collection channel
3 sand conveyor screw
4 air supply nozzle
5 air bubble 6 wastewater inlet
6a baffle
7 screening grate
8 rake
10 head
11 sand discharge point
12 water outlet
13 flotation section
14 air nozzle
15 air hose
16 channel
17 side wall
18 side wall
19 overflow edge
20 scum intake
21 water outlet connecting pipe
22 bypass line
23 overflow edge
24 inlet channel
25 overflow pipe
26 mouth
27 water level
28 overflow channel

The invention claimed is:

1. A sand catcher comprising a longitudinal deposition chamber, wherein the deposition chamber comprises a cylindrical steel container and includes a wastewater inlet at only one longitudinal end portion of the deposition chamber, a water outlet at only an opposite longitudinal end portion of the deposition chamber, air supply nozzles at one side for generating a transverse circulatory motion of water, and a sand collection channel longitudinally disposed in the lower section of the chamber, wherein the wastewater inlet leads transversely to the deposition chamber into the upper section of said deposition chamber; and the air supply nozzles are disposed on the side of the wastewater inlet below the wastewater inlet and a baffle is arranged below the wastewater inlet.

2. A sand catcher as claimed in claim 1, wherein the air supply nozzles are provided incrementally at intervals from the wastewater inlet that increase in the longitudinal direction of the deposition chamber.

3. A sand catcher as claimed in claim 1, wherein the outlet end portion of the deposition chamber comprises a flotation section, which has air nozzles with a small cross section in order to generate fine air bubbles.

4. A sand catcher as claimed in claim 1, wherein the baffle directs wastewater flowing into the deposition chamber tangentially to the cylindrical container.

5. A sand catcher as claimed in claim 1, wherein the wastewater inlet has a screening grate from which a rake removes the screenings.

6. A sand catcher as claimed in claim 5, wherein the screening grate runs at least partially below the filling height of the deposition chamber.

7. A sand catcher as claimed in claim 1, wherein the outlet end of the deposition chamber is higher than the wastewater inlet end.

8. A sand catcher as claimed in claim 7, wherein the sand collection channel has a sand conveyor screw which conveys the sand to a discharge end, and the sand discharge point lies above the water level in the deposition chamber owing to the inclination of the deposition chamber.

9. A sand catcher as claimed in claim 1, wherein the water outlet is formed by a transversely running channel on the side of the deposition chamber opposite the wastewater inlet.

10. A sand catcher as claimed in claim 9, wherein the channel has, on the side facing the wastewater inlet, a side wall that extends higher than the maximum water level in the deposition chamber, and on its side facing away from the wastewater inlet a side wall which forms an overflow edge over which the water runs into the channel.

11. A sand catcher as claimed in claim 9, wherein the side walls of the channel have the same height and in front of the side facing the wastewater inlet a downflow wall projects from the top into the deposition chamber.

12. A sand catcher as claimed in claim 10, wherein, in front of the higher side wall or the downflow wall there is a scum intake which extends as far as just below the normal water level in the deposition chamber.

13. A sand catcher as claimed in claim 1, further comprising a bypass line running from the wastewater inlet behind an overflow edge to the water outlet.

14. A sand catcher as claimed in claim 13, wherein the bypass line has a device for coarse purification and/or a scum catcher that can overflow.

15. A sand catcher as claimed in claim 5, wherein the sand collection channel is displaced with respect to a perpendicular central axis of the deposition chamber in the direction of the side of the screening grate.

16. A sand catcher as claimed in claim 1, wherein, on the side of the deposition chamber opposite the wastewater inlet, the water outlet is formed by an overflow pipe which empties into an overflow channel attached externally to the deposition chamber.

17. A sand catcher as claimed in claim 16, wherein the deposition chamber has a cylindrical cross section and the overflow pipe empties into the deposition chamber in the area of its longitudinal axis.

18. A sand catcher as claimed in claim 1, wherein the baffle extends from a side of the cylindrical container.

* * * * *